Nov. 20, 1951  K. K. K. KRØYER  2,575,667
PRESSURE RESISTING HEATING VESSEL
Filed Nov. 1, 1946  2 SHEETS—SHEET 1
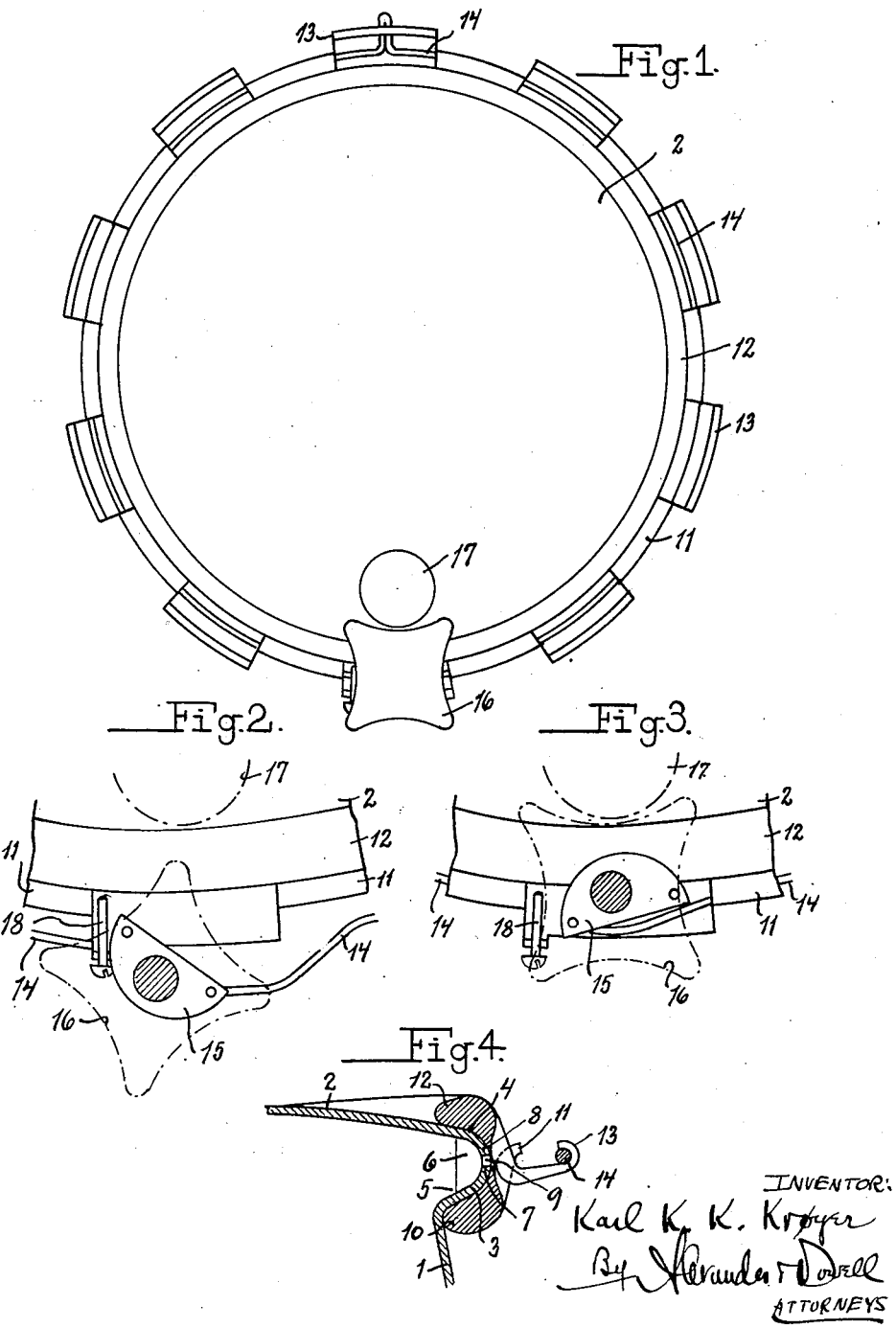

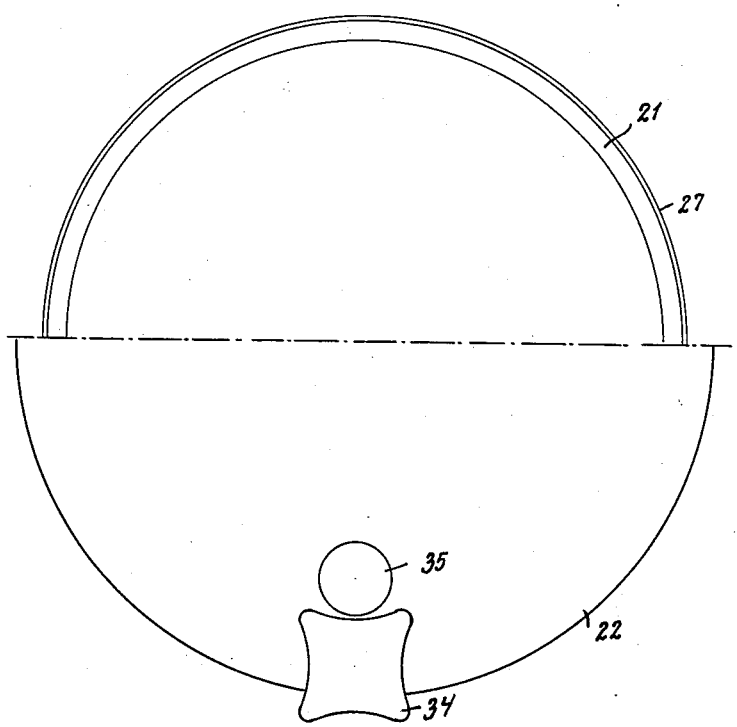
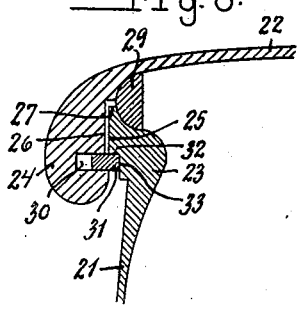

Patented Nov. 20, 1951

2,575,667

UNITED STATES PATENT OFFICE 2,575,667

PRESSURE RESISTING HEATING VESSEL

Karl Kristian Kobs Krøyer, Aarhus, Denmark

Application November 1, 1946, Serial No. 707,083
In Denmark January 29, 1946

1 Claim. (Cl. 220—61)

The present invention relates to a pressure resisting heating vessel adapted to be employed in all dimensions and for all purposes, such as for pressure cookers for domestic and restaurant purposes and for autoclaves.

It is known to construct vessels of the kind in question in such a manner that the pressure in the interior of the vessel contributes to increasing the tightening between vessel and cover instead of counteracting same, as the case when the tightening effect is effected by means of a packing or washer clamped between the vessel and the cover. Such an increase of the tightening effect under the influence of the pressure is obtained by means of packing or tightening members which under the influence of the pressure in the interior of the vessel are pressed against tightening surfaces of the vessel and the cover. Hence, when applying the cover to the vessel no tightening of nuts or the like has to be effected in order to clamp a packing or washer, but it will suffice to provide stop means preventing the cover from rising from the vessel. The well known advantages of such constructions are simplicity in design and automatic tightening irrespective of the greater or smaller care with which the device is handled.

The present invention has for its purpose to construct a vessel of the above mentioned general class, and which is simple in design; cheap to manufacture; absolutely safe and reliable in operation; and extremely easy to handle, and with these and other purposes in view a vessel of the kind in question, according to one feature of the invention, comprises a vessel body, a cover, means for tightening the joint between the vessel body and the cover under the influence of the inside pressure, gripping means associated with said vessel body and said cover, and a locking ring of variable diameter adapted in one diameter position to engage behind the gripping means of the vessel body and the cover and in another diameter position to pass free of the gripping means of one of the said members.

Further details and characteristics of the invention will appear from the following specification with reference to the accompanying drawing in which Fig. 1 shows a pressure cooker with its cover applied, in top view, Fig. 2 on a larger scale a fracture of same with the parts in one position, Fig. 3 the same as Fig. 2 with the parts in another position, Fig. 4 a vertical section through the joint between the vessel and the cover, Fig. 5 a modified construction of a pressure cooker with its cover applied, in top view, and with the cover removed in the upper half, and Fig. 6 a vertical section through the joint between the vessel and the cover in the last named embodiment.

In the drawings, 1 is the vessel body and 2 the cover. As appears from Fig. 4, the vessel body and the cover are provided at their edges with bent portions 3 and 4 respectively, which combine to form a groove 5 for receiving a tightening ring 6, e. g. consisting of India rubber. The dimensions and the shape of the bent portions 3 and 4 are selected in such a manner that when the cover is applied to the vessel the tightening ring 6 will be clamped in the groove 5 before or when the free edges 7 and 8 of the vessel and the cover respectively contact with each other, so that the tightening ring 6 is thereby caused to close the bottom of the groove 5. This construction of the tightening means is particularly advantageous and operates in the following manner: When the cover is applied to the vessel and is subsequently prevented from rising from the latter in a manner to be described in the following, the tightening ring 6 is pressed lightly against the walls of the groove between the vessel and the cover, so as to cause a provisional tightening effect, when a pressure above that of the atmosphere begins to come up in the vessel. This provisional tightening effect is at any rate sufficient for the pressure to develop in the interior of the vessel, and when this takes place the tightening ring 7, under the influence of the pressure, will be pressed towards the bottom of the groove 5 so as to tighten the gap 9 between the vessel and the cover.

The tightening ring 6 need not necessarily consist of India rubber, but may, according to circumstances such as the size of the vessel, the pressure at which the vessel operates etc. consist of any suitable material, and it may also be composed of a plurality of different parts such as a metal portion expanding under the influence of heat and thereby contributing to the tightening effect, the said metal portion being coated with a suitable tightening material, or alternatively a ground-in tightening portion of harder material may be used.

To the edge of the vessel a re-inforcement ring 10 is attached which carries a number of teeth 11, and similarly the cover is provided with a re-inforcement ring 12 carrying a number of teeth 13. The re-inforcement ring and the teeth may, if desired, be integral with the vessel and the cover. The teeth 11 and 13 are disposed in such a manner as to interlock when the cover is applied to the vessel. The teeth 13 are shaped as upwardly turned grippers, while the teeth 11 are shaped as downwardly turned grippers. The teeth 13 are longer than the teeth 11, so that a ring 14 serving to lock the cover against rising from the vessel may slide radially inwards and outwards on the teeth 13, when its diameter is varied in a manner to be described in the following. In the outermost or expanded position of the ring 14 shown in Fig. 4, the ring will not prevent the cover from being lifted from the vessel, but if the ring is displaced inwardly on the teeth 13 so as to engage below the teeth 11, it will effectively prevent the cover from rising relatively to the vessel.

For causing the said movements of the ring 14, the shown embodiment of the invention comprises a well known rotatable tightening lever 15 with an operating handle, but it is to be understood that any other means may be used for the purpose. In Fig. 2 the tightening lever is shown in the position corresponding to the expanded position of the ring, while in Fig. 3 the tightening lever is shown in the position corresponding to the contracted position of the ring, to wit the position in which the ring prevents the cover from rising from the vessel. The cover is shown provided with a screw plug 17 screwed into a hole in the lock and situated in such a position as to prevent a turning of the handle 16 of the tightening lever. Thus, when the cover is locked relatively to the vessel it is not possible to release such locking until the plug 17 has been unscrewed and thereby has permitted a pressure equalisation to take place between the interior of the vessel and the surrounding atmosphere. The plug 17 may advantageously contain a safety valve.

In order that the co-operation between the plug 17 and the handle 16 should take place in the desired manner it is necessary that the handle 16 is always situated at a pretermined circumferential position relatively to the cover, and also in other respects it is desirable that the ring as a whole should always assume a predetermined position relatively to the cover. In the embodiment shown this is obtained by providing the ring, at a suitable place of its circumference, preferably diametrically opposite to the tightening lever, with a bent-out portion 36 forming a tongue guided in a hole in one of the teeth of the cover. This hole accordingly forms a guide for the ring against displacement in the circumferential direction, and at the same time it forms a guide against displacement in an axial direction. Preferably a pin 18 is screwed into one of the teeth of the cover at another circumferential position, which pin 18 forms another guide against displacement in an axial direction. Thus, the ring as a whole is always held in a definite position relatively to the cover, but is nevertheless capable of performing the prescribed expanding and contracting movements.

In Figs. 5 and 6, 21 is the vessel, and 22 the cover. At its edge the vessel has an enlarged portion or re-inforcement ring 23 adapted to be received in a bead-like collar or re-inforcement ring 24 on the cover 22. At the top of the enlarged portion there is provided an exterior cylindrical surface 25, which—with a suitable play—forms a guide for a corresponding interior cylindrical surface 26 of the cover. Moreover, there is provided, at the top of the enlarged portion 23, an annular shoulder surface 27 co-operating with a corresponding surface 28 of the cover. Immediately inside the surfaces 27 and 28 the enlarged portion 23 of the vessel as well as the cover 22 are constructed with a rounded cross-sectional shape so that they combine to form a semi-circular groove for receiving a tightening ring 29 in similar manner as in Figs. 1–4.

In the bead-like collar 24 of the cover 22 there is provided an annular groove 30 in which a flat locking ring 31 of variable diameter is mounted. At the bottom end of the cylindrical surface 25 and immediately above the position occupied by the top wall of the groove 30 when the surfaces 27 and 28 of the vessel and the cover respectively contact with each other, the enlarged portion 23 is provided with a shoulder surface 32 after which follows a cylindrical surface 33 of smaller diameter than the cylindrical surface 25.

The diameter of the ring 31 can be varied or, in other words, the ring can be expanded and contracted in any suitable manner, e. g. by means of a tightening lever with a handle 34 in an exactly similar manner as in Figs. 1–4. Also the handle 34 may be arranged, in conformity with Figs. 1–4, to co-operate with a plug 35—which may contain a safety valve—in such a manner that the handle 34 cannot be turned until the plug 35 has been unscrewed.

The operation is as follows: When the ring 31 is in its expanded position it is fully or all but fully plunged into the groove 30, and with the ring in this position the cover can be pushed on to the vessel until the surfaces 27 and 28 strike one another. Thereby the tightening ring 29 is subjected to a light pressure against the wall of the semi-circular groove formed by the rounded portions of the enlargement 23 and the cover 22. Now, the ring 31 is contracted by turning the handle 34. Thereby the ring 31 is moved partly out of the groove 30 and contacts with the cylindrical surface 33 of the enlarged portion 33, thus engaging below the shoulder surface 32. In this contracted position of the ring 31 it is centered by the cylindrical surface 33, while up to now it has been centered by the bottom of the groove 30 in its expanded position. Now, the plug 35 is screwed into its hole in the cover, and heat is applied to the vessel. As soon as a pressure above that of the atmosphere begins to come up in the interior of the vessel, this pressure will press the tightening ring 29 against the wall of the semi-circular groove in which the tightening ring is accommodated.

As to the locking ring, all it has to do is to prevent the cover 22 from rising relatively to the vessel. This is effected by the locking ring being clamped between the shoulder surface 32 of the enlarged portion of the vessel 21 on one hand and the bottom wall of the groove 30 in the collar of the cover on the other hand. Of course there must be so much play that before such clamping takes place a small lifting movement of the cover occurs, so that the surfaces 27 and 28 are removed from contact with each other, but this is of no consequence since the gap between these surfaces is effectively tightened by the tightening ring 29.

The arrangement might of course as well be opposite to that shown, so that the groove in which the locking ring is received is provided in the vessel proper, while the shoulder surface is provided on the cover. Further, the cover might engage with the vessel on its inside instead of its outside, and many other modifications are conceivable within the scope of the invention.

Having now particularly described and ascertained the nature of my invention and in what manner the same is to be performed I declare that what I claim is:

A pressure resisting heating vessel comprising a vessel body, a cover body, said vessel body and said cover body having edge portions forming complementary portions of a groove of substantially semi-circular cross section and having the joint between vessel and cover situated about mid-way of its height so as to subdivide the wall thereof into upper and lower wall portions each having a cross sectional shape substantially forming a quarter of a circle, a removable sealing ring in said groove, said sealing ring having sufficient height to be compressed between upper and lower wall portions of said groove to thereby provide provisional sealing when said cover body rests freely on said vessel body and there is no pressure in the vessel, said groove also having outer wall portions against which said sealing ring may be pressed under the influence of a pressure in the vessel, an annular groove in one of said bodies, a locking ring of variable diameter accommodated in said groove and adapted at one diameter to be entirely in said groove and at another diameter to extend partly therefrom, means for varying the diameter of said locking ring, and a shoulder surface on the other of said bodies engageable by said locking ring when in said other diameter position and having a free space behind it to allow for axial play of said locking ring behind said shoulder surface.

KARL KRISTIAN KOBS KRØYER.

REFERENCES CITED

The following references are of record in the file of this patent:

UNITED STATES PATENTS

| Number | Name | Date |
|---|---|---|
| 1,137,085 | Riddle | Apr. 27, 1915 |
| 1,871,834 | Astrom | Aug. 16, 1932 |
| 2,086,044 | Nelson | July 6, 1937 |
| 2,133,060 | Stephens | Oct. 11, 1938 |
| 2,347,844 | Sandberg | May 2, 1944 |
| 2,414,529 | Ives | Jan. 21, 1947 |
| 2,441,131 | Blackman et al. | May 11, 1948 |
| 2,463,516 | Barkhardt | Mar. 8, 1949 |

FOREIGN PATENTS

| Number | Country | Date |
|---|---|---|
| 420,113 | Great Britain | Nov. 26, 1934 |
| 437,138 | Germany | Nov. 15, 1926 |
| 490,788 | Germany | Feb. 10, 1930 |